(12) United States Patent
Wolf et al.

(10) Patent No.: US 9,097,314 B2
(45) Date of Patent: Aug. 4, 2015

(54) TENSIONING DEVICE FOR A BELT DRIVE AND ELECTRIC MACHINE WITH SUCH A TENSIONING DEVICE

(75) Inventors: Benjamin Wolf, Bubenreuth (DE); Martin Rauch, Bamberg (DE); Christian Hauck, Altdorf (DE); Bernd Hartmann, Weisendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 191 days.

(21) Appl. No.: 13/572,802

(22) Filed: Aug. 13, 2012

(65) Prior Publication Data

US 2013/0040770 A1 Feb. 14, 2013

(30) Foreign Application Priority Data

Aug. 12, 2011 (DE) .......................... 10 2011 080 909
Sep. 8, 2011 (DE) .......................... 10 2011 082 330

(51) Int. Cl.
*F16H 7/12* (2006.01)
*F02B 67/06* (2006.01)
*F16H 7/08* (2006.01)

(52) U.S. Cl.
CPC ............... *F16H 7/1281* (2013.01); *F02B 67/06* (2013.01); *F16H 2007/0806* (2013.01); *F16H 2007/0874* (2013.01); *F16H 2007/0893* (2013.01)

(58) Field of Classification Search
CPC .......... F16H 7/1281; F16H 2007/0806; F16H 2007/0808; F16H 2007/0874; F16H 2007/0893; F02B 67/06
USPC .......... 474/101, 113, 117, 118, 133, 134, 135
See application file for complete search history.

(56) References Cited

U.S. PATENT DOCUMENTS

| 6,648,783 | B1 * | 11/2003 | Bogner ......................... | 474/134 |
| 7,901,310 | B2 * | 3/2011 | Lolli et al. .................... | 474/134 |
| 8,821,328 | B2 * | 9/2014 | Jud et al. ....................... | 474/134 |
| 2006/0217222 | A1 * | 9/2006 | Lolli et al. .................... | 474/134 |
| 2009/0298631 | A1 * | 12/2009 | Jud et al. ....................... | 474/237 |
| 2012/0028744 | A1 * | 2/2012 | Hartmann et al. ........... | 474/135 |
| 2013/0095967 | A1 * | 4/2013 | Wolf et al. .................... | 474/135 |
| 2013/0203535 | A1 * | 8/2013 | Mack et al. .................... | 474/134 |
| 2014/0315673 | A1 * | 10/2014 | Zacker et al. ................. | 474/135 |

FOREIGN PATENT DOCUMENTS

| DE | 19926615 | 12/2000 |
| DE | 10044645 | 3/2002 |
| DE | 102006019877 | 10/2007 |
| DE | 102008025552 | 12/2009 |
| EP | 2128489 | 12/2009 |
| WO | WO2010130553 | * 11/2010 ............... F16H 7/12 |

* cited by examiner

*Primary Examiner* — Sang Kim
*Assistant Examiner* — Juan Campos, Jr.
(74) *Attorney, Agent, or Firm* — Volpe and Koenig, P.C.

(57) ABSTRACT

A tensioning device (2) for a starter generator belt drive of an internal combustion engine and a starter generator (1) with such a tensioning device. The tensioning device is to be supported on the machine housing (3, 3') of the starter generator by a slide bearing.

9 Claims, 5 Drawing Sheets

Fig. 4
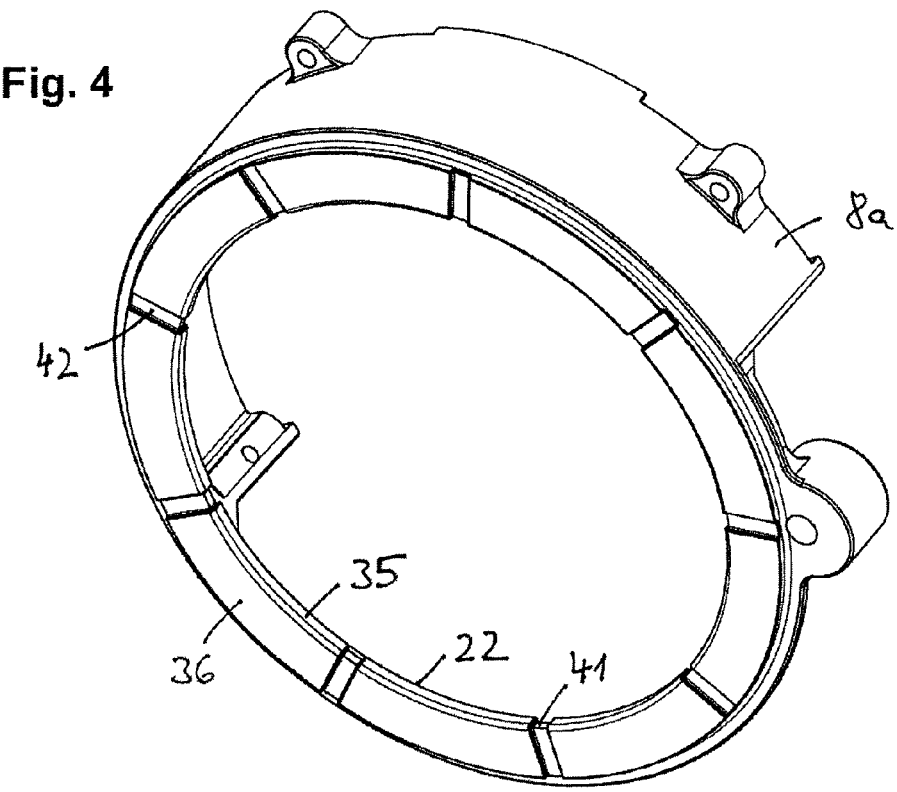
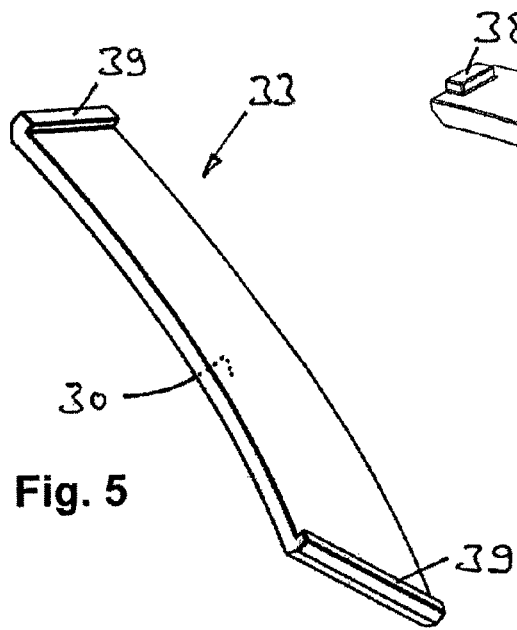
Fig. 5
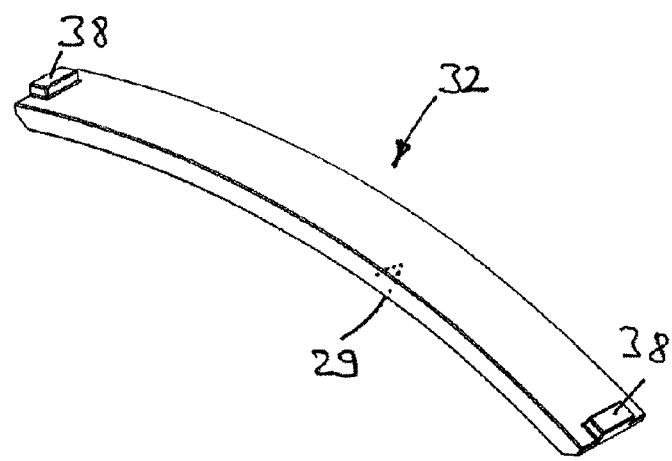
Fig. 6

TENSIONING DEVICE FOR A BELT DRIVE AND ELECTRIC MACHINE WITH SUCH A TENSIONING DEVICE

CROSS-REFERENCE TO RELATED APPLICATIONS

This application claims the benefit of German Patent Application No. 102011080909.0, filed Aug. 12, 2011 and German Patent Application No. 102011082330.1, filed Sep. 8, 2011, both of which are incorporated herein by reference as if fully set forth.

BACKGROUND

The invention relates to a tensioning device for a belt drive that has an endlessly revolving belt, an electric machine with a machine housing and a drive wheel and at least one additional drive wheel that is in drive connection with the drive wheel via the belt, wherein the tensioning device comprises the following:
- a tensioner housing that is supported by means of a slide bearing on the machine housing so that it can pivot about the axis of the drive wheel,
- two tensioning rollers that apply a pre-tensioning force to the belt before and after the drive wheel in the direction of revolution of the belt,
- a spring means generating the pre-tensioning force,
- and a tensioning arm supported against the force of the spring means so that it can move in the tensioner housing, wherein one of the tensioning rollers is supported on the tensioning arm and the other tensioning roller is supported fixed in place on the tensioner housing.

The invention also relates to an electric machine with such a tensioning device.

For belt drives with drive wheels receiving and producing alternating torque and a corresponding change from the tight belt span to the slack belt span, the tensioning of the slack belt span requires a tensioning device with two tensioning rollers that pre-tension the traction element before and after the alternating driving and driven drive wheel. This typically by not necessary involves the belt drive of an internal combustion engine with an electric machine in the form of a starter generator that is not only driven by the internal combustion engine for the purpose of generating electricity, but also drives the internal combustion engine, in order to start this internal combustion engine.

Known tensioning devices, like those disclosed, for example, in DE 199 26 615 A1, DE 10 2008 025 552 A1, and DE 10 2006 019 877 A1, each have a tensioner housing mounted on the starter generator and two tensioning arms that are supported so that they can move within this housing, with force being applied onto the tensioning rollers of these tensioning arms by a spring element that is arranged in-between, in order to tension the belts.

A tensioning device of the type named above, i.e., with only one tensioning arm that is supported so that it can move in the tensioner housing on one side and a tensioning roller that is fixed on the housing on the other side, and an electric machine with such a tensioning device are known from the unpublished DE 10 2010 048 206 A1.

SUMMARY

Starting with this background, the present invention is based on the objective of structurally improving a tensioning device of the type named above and an electric machine with such a tensioning device with respect to the slide bearing on the machine housing.

The solution to meeting this objective with respect to the tensioning device is provided in that the slide bearing supports the tensioner housing on the machine housing with radial slide bearing surfaces in the radial direction and with axial slide bearing surfaces in the two axial directions. In other words, the slide bearing of the tensioning device is structurally designed so that its slide bearing surfaces support the tensioner housing on the housing of the electric machine not only in the radial direction but also in the axial direction on corresponding slide bearing surfaces.

The tensioner housing can be provided with a bearing ring, wherein the radial and axial slide bearing surfaces of the tensioner housing run on the inner lateral surface and on the end sides, respectively, of this bearing ring. Advantageously, the radial and the axial slide bearing surfaces of the tensioner housing are formed by slide coatings that are arranged locked against rotation on the inner lateral surface and on the end sides, respectively, of the bearing ring.

The slide coatings could each be assembled from circular arc-shaped coating segments. These are advantageously provided with projections that are used for the purpose of positive-fit rotational locking in the inner peripheral-side and end-side recesses, respectively, in the bearing ring.

The circular slide coatings or optionally the coating segments could also be connected only with a material fit on the bearing ring, in particular, bonded, in one alternative construction.

The solution to meeting the objective with respect to the electric machine is provided in that the slide bearing surfaces of the machine housing form a channel that runs in the peripheral direction of the housing and has an essentially U-shaped cross section that opens outward in the radial direction and the bearing ring extends radially inward into this channel.

Here, one of the axial slide bearing surfaces of the machine housing can be constructed directly on the machine housing, while its other axial slide bearing surface is constructed on a bearing washer that is screwed to the machine housing and is arranged on the end side of the bearing ring turned away from the machine housing. This structural design leads to an especially compact bearing, i.e., it saves installation space, for the tensioning device on the machine housing.

Furthermore, the tensioning roller supported fixed in place on the tensioner housing should be arranged in the peripheral direction of the belt in front of the drive wheel. In this arrangement of the tensioning rollers, the risk of tipping of the belt section running on the drive wheel of the electric machine, which comes with noticeable acoustics and increased wear, is significantly less than for the inverse tensioning roller arrangement, because the housing-fixed tensioning roller has no bearing play between the tensioning arm and tensioning roller. This play can promote belt tipping.

BRIEF DESCRIPTION OF THE DRAWINGS

An embodiment of the invention is shown in the drawings described below. Shown are:

FIG. 4 is a first perspective detail view (rear side) of a tensioner housing part of the tensioning device according to FIG. 1, FIG. 5 is a rear view of a coating segment for forming the axial slide bearing surface of the tensioner housing, FIG. 6 is a view of a coating segment for forming the radial slide bearing surface of the tensioner housing.

DETAILED DESCRIPTION OF THE PREFERRED EMBODIMENTS

Figure 1:
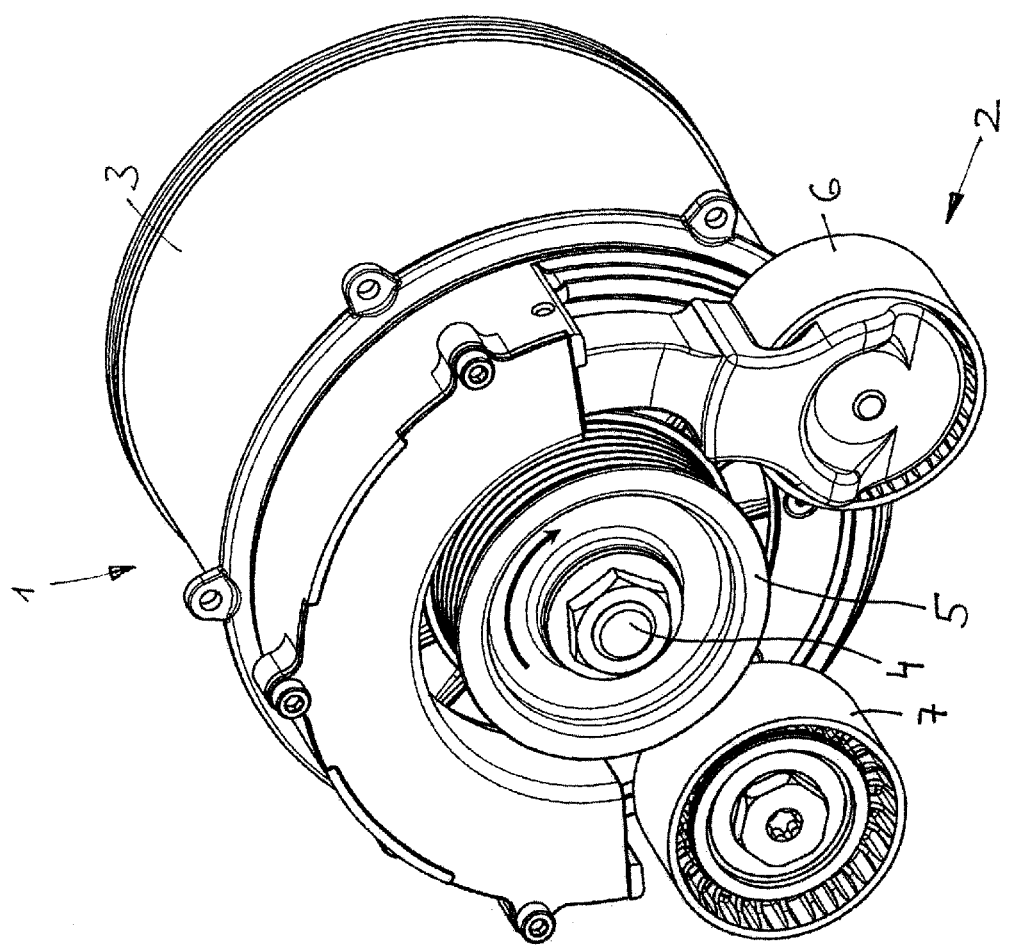
FIG. 1 is a perspective overall view of an electric machine according to the invention with tensioning device that is mounted on this machine.

The electric machine 1 shown in FIG. 1 involves a starter generator of an auxiliary unit belt drive of an internal combustion engine, wherein the starter generator 1 is assembled into a structural unit with a tensioning device 2 for a (not shown) endlessly revolving poly-V belt. The starter generator 1 comprises a generally cylindrical machine housing 3 and a drive wheel 5 that is screwed onto an axle 4 and is in drive connection by the belt with at least the (likewise not shown) crankshaft drive wheel of the internal combustion engine.

The crankshaft drive wheel is driven by the drive wheel 5 of the starter generator 1 in a known way for starting the internal combustion engine, in order to then drive the drive wheel 5 for generating electricity when the internal combustion engine has started. The drive wheel 5 producing and receiving torque in a correspondingly alternating manner causes a synchronous change of the tight span and slack span in the belt drive that has the direction of belt revolution shown on the drive wheel 5. During the starting operation of the internal combustion engine, the belt span that runs in front of the driving drive wheel 5 in the direction of revolution is the tight span and the belt span that runs behind the drive wheel 5 in the direction of revolution is the slack span. Conversely, in the generator operation, the belt span that is in front of the then driving drive wheel 5 in the direction of revolution is the slack span and the belt span that runs behind the drive wheel 5 in the direction of revolution is the tight span.

Figure 2:
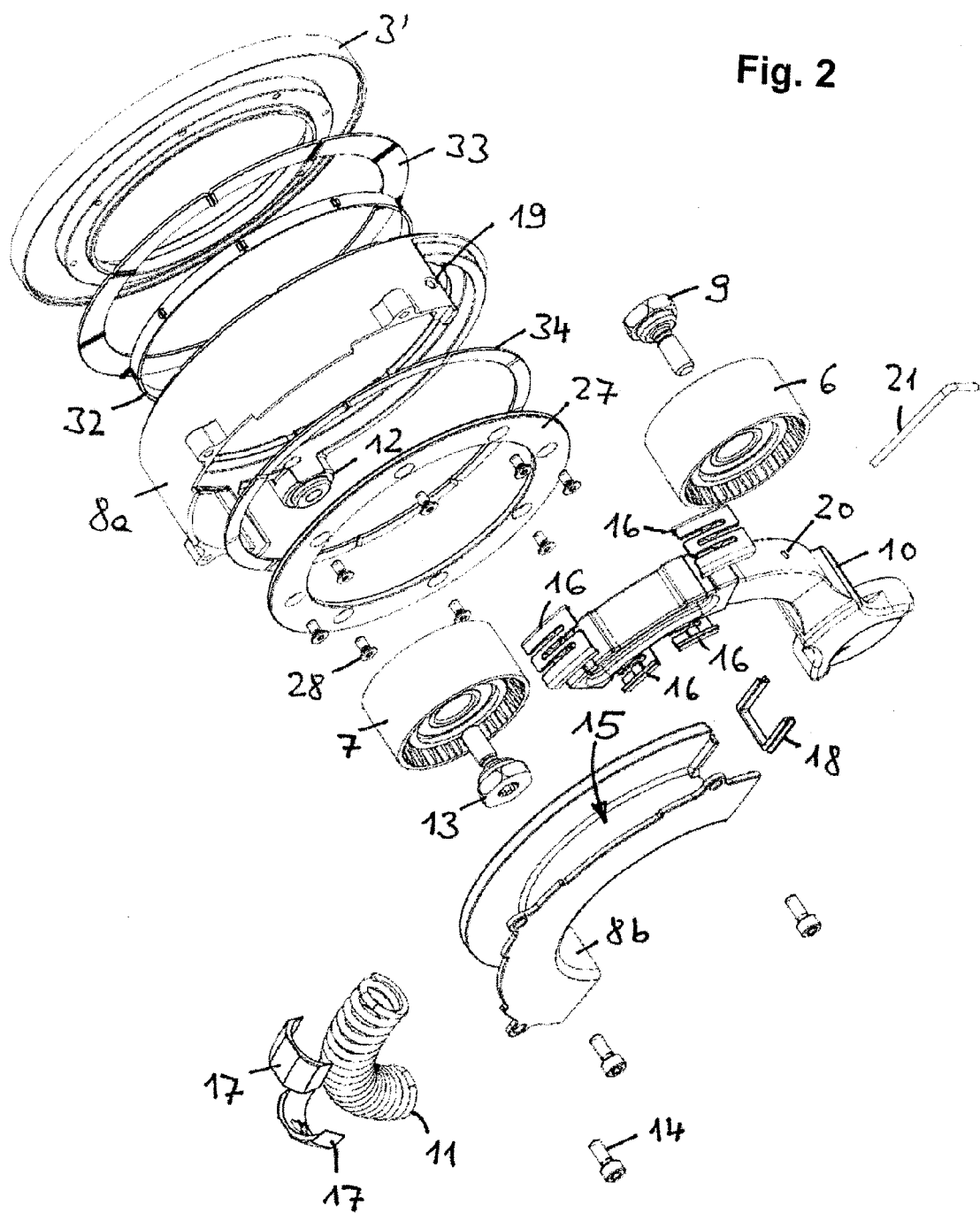
FIG. 2 is an exploded view of the tensioning device according to FIG. 1.

The tensioning device 2 is mounted on the machine housing 3 on the front side and comprises two tensioning rollers 6 and 7 that apply a pre-tensioning force on the belt in front of and behind the drive wheel 5 in the direction of revolution of the belt, in order to tension the alternating slack span of the belt drive. The structure of the tensioning device 2 is explained below with reference to FIGS. 2 and 3. The machine housing 3 is symbolized there by the machine housing disk 3' that runs on the rear side of the tensioning device 2 and does not exist as such in FIG. 1, but instead is constructed in one piece on the machine housing 3.

The tensioning device 2 comprises a tensioner housing 8 that is supported on the front side of the machine housing 3 so that it can pivot about the axle 4 of the drive wheel 5. The tensioning roller 6 arranged behind the drive wheel 5 in the direction of revolution of the belt is supported on a tensioning arm 10 by an axle bolt 9, wherein the circular arc-shaped arm section of this tensioning arm is supported in the tensioner housing 8 so that it can move against a spring element generating the pre-tensioning force in the form of a bow spring 11 about the axle 4 of the drive wheel 5. In contrast, the other tensioning roller 7 is supported fixed in place on the tensioner housing 8. The tensioner housing part 8a is here provided with a journal 12 in which the axle bolt 13 of the other tensioning roller 7 is screwed. The tensioner housing 8 includes two radially extending flanges and the tensioning arm 10 is axially supported by the two radially extending flanges of the tensioner housing 8.

The pivoting bearing of the overall tensioning device 2 allows the tensioner housing 8 to pivot with the tensioning rollers 6, 7 about the axle 4 of the drive wheel 5 when the operation of the starter generator 1 changes and the tight span and the slack span switch accordingly in the belt drive. For example, when the starter generator 1 changes from the starter operation to the generator operation, the belt span on the side of the tensioning roller 6 moving on the housing side changes from the slack span to the tight span and the belt span on the side of the tensioning roller 7 fixed in place on the housing side changes from the tight span to the slack span. Consequently, this change in operation leads to a pivoting of the tensioning device 2 from the then currently tight span on the side of the tensioning roller 6 into the then currently slack span on the side of the tensioning roller 7, i.e., for the direction of revolution drawn, to a switch against the direction of revolution. Here, the pre-tensioning force in the belt drive is always maintained by the bow spring 11 that applies a compressive force on the tensioning arm 10 out from the tensioner housing 8.

The tensioner housing 8 is assembled from a first tensioner housing part 8a and a second tensioner housing part 8b that is mounted on the first part by the threaded joint 14 (three bolts in FIG. 2) and defines, together with the tensioner housing part 8a, a circular arc-shaped receptacle space 15 with a rectangular cross section for the tensioner arm 10 and the arc spring 11. The bearing and oscillation damping of the tensioning arm 10 and the bow spring 11 in the tensioner housing 8 are realized by slide bearing shells 16 and 17. The other tensioner housing part 8b is provided with a sealing strip 18 that protects the receptacle space 15 from the penetration of dirt particles. The locking pin 21 inserted through the housing drilled hole 19 into the tensioning arm drilled hole 20 is used as a mounting securing device that fixes the tensioning arm 10 in a pre-tensioned transport position before the starter generator 1 is installed with the tensioning device 2 in the belt drive.

The pivoting bearing of the tensioner housing 8 on the starter generator 1 is realized by a slide bearing that supports the tensioner housing 8 on the front side of the machine housing 3 with radial slide bearing surfaces in the radial direction and with axial slide bearing surfaces in the two axial directions. As can be easily seen especially in the longitudinal cross-section view according to FIG. 3, the tensioner housing part 8a is provided with a bearing ring 22 that extends radially inward into a channel 23 running in the peripheral direction of the machine housing 3. This channel 23 is formed by the radial and the axial slide bearing surfaces 24 or 25 and 26 of the machine housing 3 and has an essentially U-shaped cross section opening outward in the radial direction. An axial slide bearing surface 25 of the machine housing 3 is constructed directly on its front side and the other axial slide bearing surface 26 is constructed on a separate bearing disk 27. The bearing side 27 is arranged on the end side of the bearing ring 22 facing away from the machine housing 3 and attached on the machine housing 3 by the bolt connection 28 (eight bolts in FIG. 2).

Through the axial offset of the slide bearing relative to the belt plane—this runs approximately centrally through the tensioning roller 6—the slide bearing is loaded with a tipping moment that results from the oscillating belt forces and loads the axial slide bearing surfaces with corresponding oscillating transverse reaction forces. Consequently, the slide bearing also produces a load-dependent damping of the pivoting motion of the tensioner housing 8.

Figure 3:
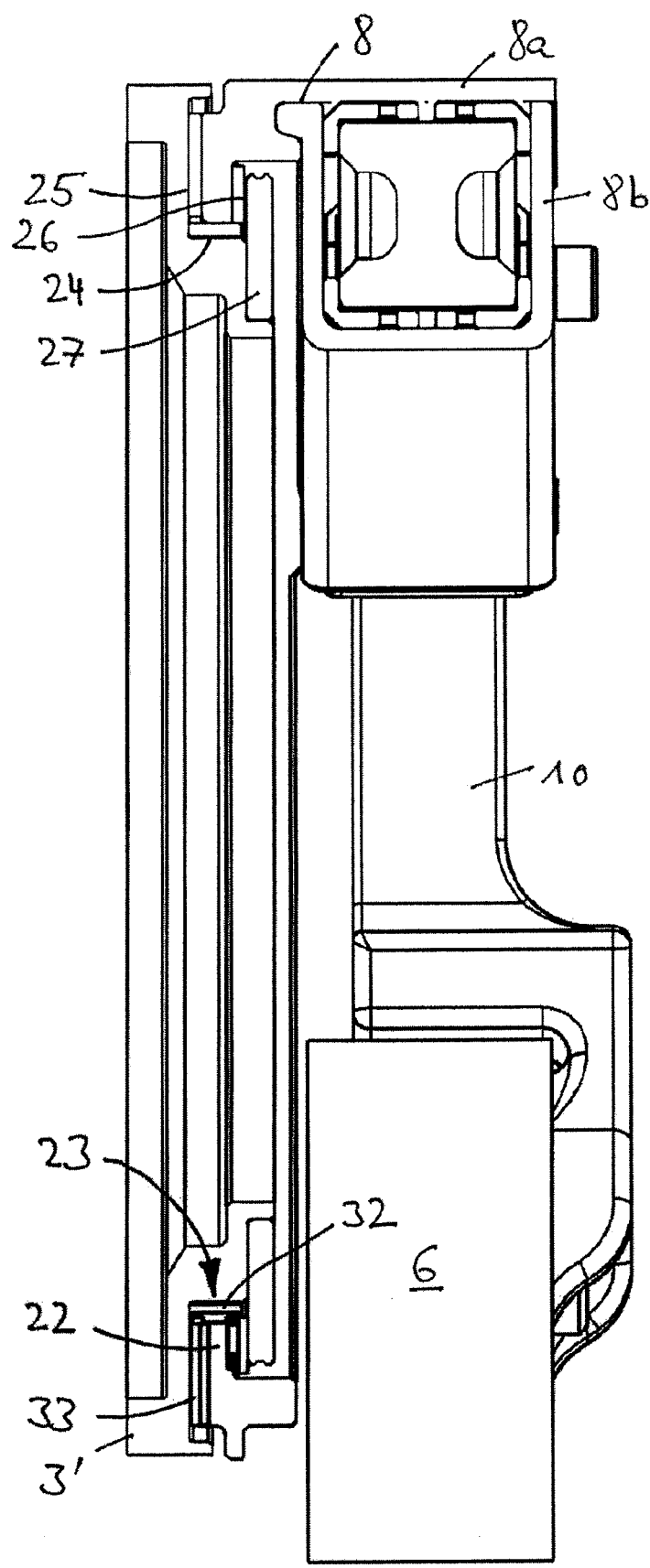
FIG. 3 is a longitudinal cross-sectional view of the tensioning device according to FIG. 1.
Figure 7:
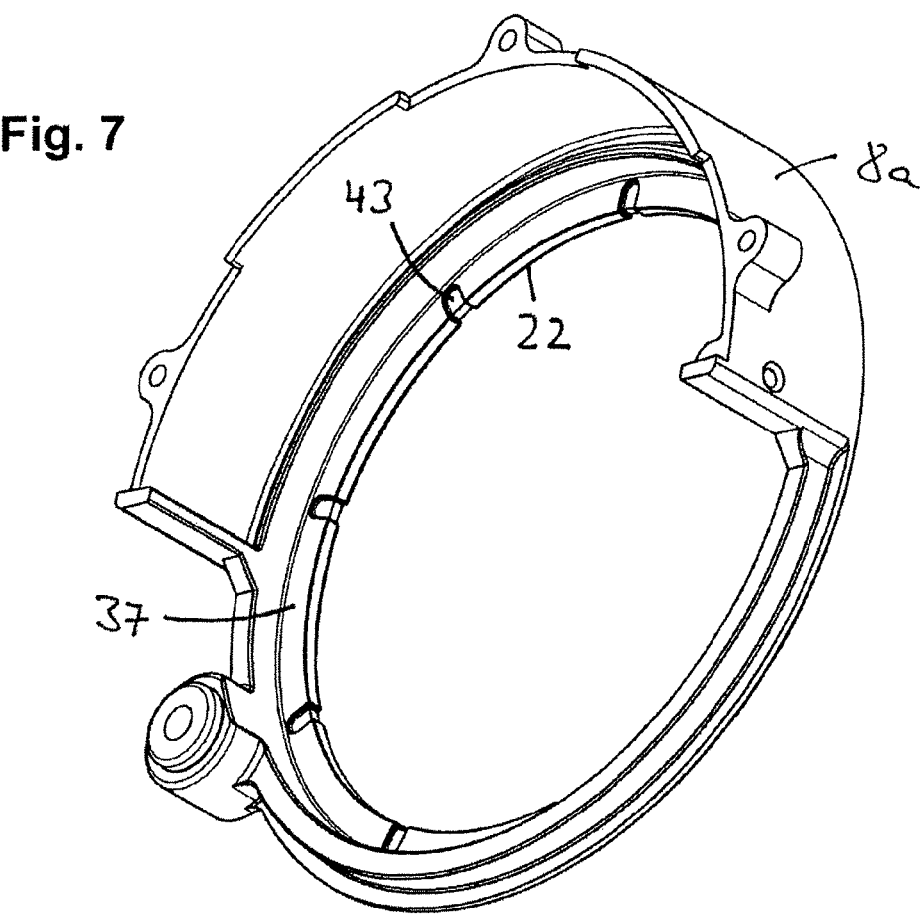
FIG. 7 is a second perspective detail view (front side) of the tensioner housing part of the tensioning device according to FIGS. 1 and 4.

From a comparison of FIGS. 1 and 3 it becomes clear that the slide bearing and the bearing disk 27 run radially completely outside of the drive wheel 5 or that—in other words— the smaller inner diameter of both is greater than the outer diameter of the drive wheel 5. This component dimensioning allows the tensioning device 2 to be mounted on the housing 3 of the starter generator 1 with the drive wheel 5 already screwed on.

As becomes clear from FIGS. 2 to 8, the radial and axial slide bearing surfaces 29 or 30 and 31 of the tensioner housing 8 are each formed by slide coatings 32 or 33 and 34 that are arranged with a positive fit locked against rotation on the inner lateral surface 35 or on the end sides 36 and 37 of the bearing ring 22. The slide coatings 32, 33, and 34 are formed of the slide bearing material PA46 PTFE15 are each assembled from nine circular arc-shaped coating segments into a circular shape and are provided on the ends with tabs 38, 39, and 40 that project in the radial or axial directions and are used for the purpose of rotational locking in the inner peripheral side or end-side recesses 41, 42, and 43 in the bearing ring 22.

The coating segment 33 shown in FIG. 5 forms the one axial slide bearing surface 30 of the tensioner housing 8 that runs on the end side 36 facing the machine housing 3 (rear side of the tensioner housing part 8*a* according to FIG. 4) of the bearing ring 22 and slides directly on the axial slide bearing surface 25 of the machine housing 3.

The coating segment 32 shown in FIG. 6 forms the radial slide bearing surface 29 of the tensioner housing 8 that runs on the inner lateral surface 35 of the bearing ring 22 and slides on the outer lateral surface 24 of the machine housing 3 (see FIG. 3).

Figure 8:
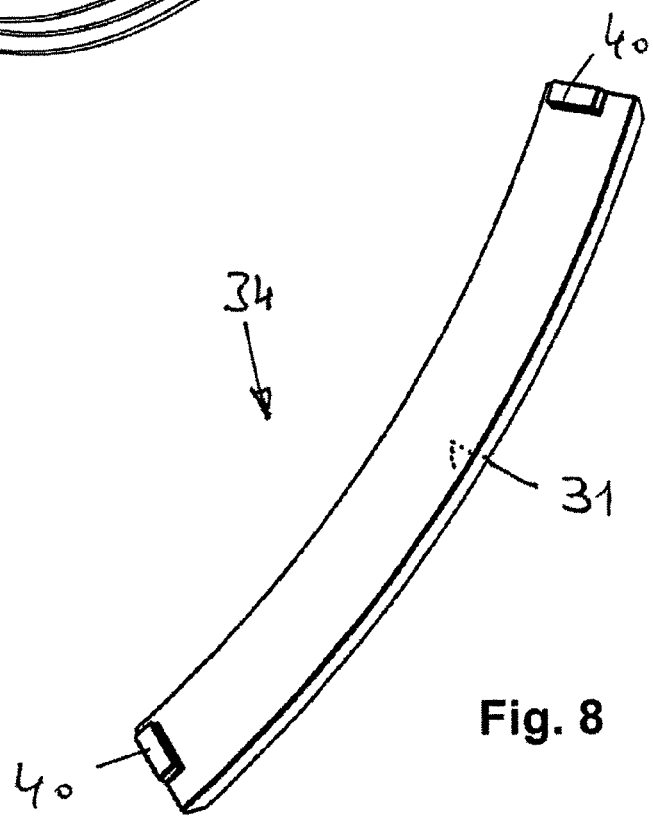
FIG. 8 is a view of a coating segment for forming the axial slide bearing surface of the tensioner housing on the front side.

The coating segment 34 shown in FIG. 8 forms the other axial slide bearing surface 31 of the tensioner housing 8 that runs on the end side 37 facing away from the machine housing 3 (front side of the tensioner housing part 8*a* according to FIG. 7) of the bearing ring 22 and slides on the axial slide bearing surface 26 of the bearing disk 27.

A tipping of the slide bearing caused by the tipping moment mentioned above in the scope of the axial bearing play due to component tolerances is minimized in that both the coating segments 33 and also the coating segments 34 have different thicknesses relative to each other, i.e., across the periphery of the slide bearing. Here, the "thick" coating segments are arranged at the position of the bearing ring 22 where they support the largest transverse forces, while conversely the "thin" coating segments are arranged where they support the smallest or even no transverse forces.

LIST OF REFERENCE NUMERALS

1 Electric machine/starter generator
2 Tensioning device
3 Machine housing
4 Axle of the drive wheel
5 Drive wheel
6 Movable tensioning roller
7 Stationary tensioning roller
8 Tensioner housing
9 Axle screw of the movable tensioning roller
10 Tensioning arm
11 Spring element/bow spring
12 Journal
13 Axle bolt of the stationary tensioning roller
14 Bolts of the tensioner housing
15 Receptacle
16 Slide bearing shell of the tensioning arm
17 Slide bearing shell of the bow spring
18 Sealing strip
19 Housing drilled hole for locking pin
20 Tensioning arm drilled hole for locking pin
21 Locking pin
22 Bearing ring
23 Channel
24 Radial slide bearing surface of the machine housing
25 Axial slide bearing surface of the machine housing
26 Axial slide bearing surface of the machine housing
27 Bearing washer
28 Threaded joint of the bearing washer
29 Radial slide bearing surface of the tensioner housing
30 Axial slide bearing surface of the tensioner housing
31 Axial slide bearing surface of the tensioner housing
32 Radial slide coating/coating segment
33 Axial slide coating/coating segment
34 Axial slide coating/coating segment
35 Inner lateral surface
36 End side of the bearing ring
37 End side of the bearing ring
38 Tab of the radial slide coating
39 Tab of the axial slide coating
40 Tab of the axial slide coating
41 Recess for radial slide coating
42 Recess for axial slide coating
43 Recess for axial slide coating

The invention claimed is:

1. Tensioning device for a belt drive that has an endlessly revolving belt, an electric machine with a machine housing and a drive wheel and at least one additional drive wheel that is in drive connection with the drive wheel via the belt, wherein the tensioning device comprises:
a tensioner housing that is supported by a slide bearing on the machine housing so that the tensioner housing can pivot about an axis of the drive wheel,
two tensioning rollers that apply a pre-tensioning force to the belt before and after the drive wheel in a direction of revolution of the belt,
a spring element that generates the pre-tensioning force,
and a tensioning arm that is slidably supported in the tensioner housing so that the tensioning arm can move against the force of the spring element and the tensioner housing includes two radially extending flanges, and the tensioning arm is axially supported by the two radially extending flanges of the tensioner housing,
wherein one of the tensioning rollers is supported on the tensioning arm and the other tensioning roller is supported fixed in place on the tensioner housing, the slide bearing supporting the tensioner housing on the machine housing, and the slide bearing includes radial slide bearing surfaces in a radial direction and axial slide bearing surfaces in two axial directions.

2. The tensioning device according to claim 1, wherein the tensioner housing is provided with a bearing ring, radial and the axial slide bearing surfaces of the tensioner housing run, respectively, on an inner lateral surface and on end sides of the bearing ring.

3. The tensioning device according to claim 2, wherein the radial and the axial slide bearing surfaces of the tensioner housing are formed by coating segments that are arranged secured against rotation on the inner lateral surface and on the end sides, respectively, of the bearing ring.

4. The tensioning device according to claim 3, wherein the coating segments are circular arc-shaped.

5. The tensioning device according to claim 4, wherein the coating segments are provided with projections that are used for positive-fit rotational locking in recesses in the bearing ring on an inner peripheral side or on the end.

6. An electric machine with the tensioning device according to claim 2 supported on the machine, wherein the slide bearing surfaces form a channel that runs in a direction of revolution and has an essentially U-shaped cross section opened radially outward, with the bearing ring extending radially inward into the channel.

7. The electric machine according to claim 6, wherein one of the axial slide bearing surfaces is constructed directly on the machine housing and another axial slide bearing surface is constructed on a bearing washer that is bolted with the machine housing and is arranged on the end side of the bearing ring facing away from the machine housing.

8. The electric machine according to claim 7, wherein the slide bearing and the bearing washer run radially completely outside of the drive wheel.

9. The electric machine according to claim 6, wherein the tensioning roller supported fixed in place on the tensioner housing is arranged in front of the drive wheel in a direction of revolution of the belt.

\* \* \* \* \*